United States Patent
Hofmann et al.

(10) Patent No.: US 9,440,511 B2
(45) Date of Patent: Sep. 13, 2016

(54) SOUND DEADENING BAFFLE FOR A VENTILATION VALVE

(75) Inventors: Juergen Hofmann, Eisenberg (DE); Vitali Leidner, Enkenbach-Alsenborn (DE)

(73) Assignee: ITW Fastener Products GmbH, Iserlohn (DE)

( * ) Notice: Subject to any disclaimer, the term of this patent is extended or adjusted under 35 U.S.C. 154(b) by 629 days.

(21) Appl. No.: 13/575,123

(22) PCT Filed: Mar. 10, 2011

(86) PCT No.: PCT/EP2011/001053
§ 371 (c)(1),
(2), (4) Date: Sep. 12, 2012

(87) PCT Pub. No.: WO2011/110306
PCT Pub. Date: Sep. 15, 2011

(65) Prior Publication Data
US 2013/0052930 A1 Feb. 28, 2013

(30) Foreign Application Priority Data
Mar. 10, 2010 (DE) .................. 10 2010 010 927

(51) Int. Cl.
B60H 1/24 (2006.01)

(52) U.S. Cl.
CPC .................... B60H 1/248 (2013.01)

(58) Field of Classification Search
CPC ......... B60H 1/248; B60H 1/249; B60H 1/24
USPC ................................. 454/162, 164
See application file for complete search history.

(56) References Cited

U.S. PATENT DOCUMENTS

| | | | | |
|---|---|---|---|---|
| 1,550,503 A * | 8/1925 | Coffman | ............... | B60H 1/248 454/136 |
| 2,123,287 A * | 7/1938 | Ney | ................. | F24F 13/08 454/216 |
| 2,820,406 A * | 1/1958 | Argentieri | .............. | F24F 11/025 181/256 |
| 3,357,338 A * | 12/1967 | Pollock | ................. | B60H 1/248 236/49.3 |
| 4,537,115 A | 8/1985 | Haesters | | |
| 4,667,578 A * | 5/1987 | Hagenah | ............... | B60H 1/249 454/164 |
| 4,691,623 A * | 9/1987 | Mizusawa | ............. | B60H 1/249 137/512.15 |
| 4,781,106 A * | 11/1988 | Frien | .................... | B60H 1/249 137/512.1 |
| 4,920,865 A * | 5/1990 | Pasquali | ............... | B60H 1/249 454/164 |
| 4,958,555 A * | 9/1990 | Lentz | .................... | F24F 13/08 454/277 |
| 5,167,574 A * | 12/1992 | Ikeda | ................ | B60H 1/00664 137/512.1 |

(Continued)

FOREIGN PATENT DOCUMENTS

| | | |
|---|---|---|
| DE | 2063510 | 7/1972 |
| DE | 2742667 | 3/1979 |

(Continued)

OTHER PUBLICATIONS

Instruction Manual Type Gunclean Toftejorg SSt40T, Jun. 9, 2012.

*Primary Examiner* — Steven B McAllister
*Assistant Examiner* — Jonathan Cotov
(74) *Attorney, Agent, or Firm* — Joseph M. Butscher; The Small Patent Law Group, LLC

(57) ABSTRACT

A baffle (10) for a venting valve for reducing the admission of sound into the interior in particular of a motor vehicle, including at least one air guiding channel (16, 18, 20, 22) having a labyrinth geometry.

14 Claims, 4 Drawing Sheets

(56) References Cited

U.S. PATENT DOCUMENTS

| | | | | |
|---|---|---|---|---|
| 5,205,782 | A * | 4/1993 | Ohba | B60H 1/00428 454/141 |
| 5,419,739 | A * | 5/1995 | Lewis | B60H 1/249 137/855 |
| 5,492,505 | A * | 2/1996 | Bell | B60H 1/249 137/855 |
| 5,759,097 | A * | 6/1998 | Bernoville | B60H 1/249 137/512.1 |
| 6,026,852 | A * | 2/2000 | Barton | B29C 45/0062 137/512.1 |
| 6,210,266 | B1 * | 4/2001 | Barton | B29C 45/1676 137/855 |
| 6,648,749 | B2 * | 11/2003 | Hayashi | B60H 1/249 454/162 |
| 6,969,314 | B2 * | 11/2005 | Misner | B60H 1/249 137/512.1 |
| 7,137,880 | B2 * | 11/2006 | Omiya | B60H 1/249 454/162 |
| 8,955,542 | B2 * | 2/2015 | Kiezulas | B60H 1/249 137/512 |
| 2004/0253566 | A1 * | 12/2004 | Quinn | B60H 1/248 434/162 |
| 2007/0184772 | A1 * | 8/2007 | McConnell | B60H 1/249 454/139 |
| 2008/0076344 | A1 * | 3/2008 | Flowerday | B60H 1/249 454/162 |

FOREIGN PATENT DOCUMENTS

| | | |
|---|---|---|
| DE | 3326030 | 1/1985 |
| DE | 19517157 | 4/1996 |
| DE | 102008008415 | 8/2009 |
| EP | 0 306 073 | 3/1989 |
| EP | 0 365 395 | 4/1990 |
| FR | 2 691 679 | 12/1993 |
| GB | 1 067 863 | 5/1967 |
| JP | 50113136 | 2/1949 |
| JP | 5138862 | 9/1949 |
| JP | 57113215 | 12/1955 |
| JP | 60151117 | 8/1985 |
| JP | 6290719 | 6/1987 |
| JP | 2005008126 | 1/2005 |

* cited by examiner

SOUND DEADENING BAFFLE FOR A VENTILATION VALVE

RELATED APPLICATIONS

This application corresponds to PCT/EP2011/001053, filed Mar. 3, 2011, which claims the benefit of German Application No. 10 2010 010 927.4, filed Mar. 10, 2010, the subject matter, of which are incorporated herein by reference in their entirety.

BACKGROUND OF THE INVENTION

The invention relates to a baffle for a venting valve for reducing the sound admission into the interior in particular of a motor vehicle.

Venting valves for the vehicle interior are generally known. They serve to evacuate the air supplied to the vehicle interior through a ventilating and/or air conditioning system to the outside. Such a venting valve usually has a plurality of check valves which permit the exit of the air out of the vehicle interior but prevent the undesired penetration of outside air and of dirt and water.

In order to satisfy increasing comfort requirements, different attempts have already been made to reduce the undesired admission of sound into the vehicle interior through the venting valve. Noise protection caps are known which are coated with a sound absorbing foam. However, it became apparent that the efficiency of such noise protection caps is very limited. Furthermore, the noise protection caps are comparatively expensive as their manufacturing is complicated.

SUMMARY OF THE INVENTION

The object of the invention is to reduce the undesired admission of sound into the vehicle interior by simple and cost-effective measures in the field of the venting valve.

To achieve this object, a baffle for a venting valve is provided according to the invention for reducing the sound admission into the interior in particular of a motor vehicle, including at least one air guiding channel having a labyrinth geometry. The invention is based on the basic idea to provide the venting valve with an add-on part having a simple structure and preventing or at least reducing the sound admission into the interior. The labyrinth geometry of the venting channel results in that large part of the sound waves are reflected and reverberated to the outside. It is not necessary to use expensive absorption materials. The labyrinth geometry permits with little expenditure to realize the desired reflection geometry without the flow cross-section of the air guiding channel necessary for the air exchange being noticeably reduced.

According to an embodiment of the invention, it is provided that at least one reflection wall is arranged in the air guiding channel. The sound waves incident on this reflection wall are reflected and reverberated so that they cannot enter the vehicle interior.

It is preferably provided that two reflection walls are arranged in the air guiding channel. In particular, they can be arranged so as to be opposite each other such that the noise protecting effect of the baffle is further increased.

According to an embodiment, one of the reflection walls is realized as an extension formed in one piece with the bottom of the air guiding channel. This configuration is characterized by a low manufacturing expenditure.

It is preferably provided that the baffle has a mounting side provided for the connection with the venting valve, and that one of the reflection walls is arranged at the end of the air guiding channel facing away from the mounting side, the other of the reflection walls being arranged approximately in the middle of the air guiding channel. In this way, it is possible to maintain a large cross-section of the air guiding channel while ensuring at the same time a good reflecting effect.

According to an alternative configuration, it is provided that the air guiding channel extends in an angled manner. This configuration is based on the finding that a sufficient noise protecting effect can be obtained already by an angled extension.

According to a simple configuration, it is provided that the bottom of the air guiding channel extends from an inlet side of the baffle first so as to be ascending, and then descending. Apart from the noise protecting effect, such a configuration permits to also produce a protection against the undesired penetration of water without further expenditures.

It is preferably provided that the vertex of the bottom extends at least at the level of the upper edge of the outlet-side end of the air guiding channel. This configuration ensures a sufficient offset of the walls of the air guiding channel with respect to each other, so that a very good noise protecting effect is obtained.

According to a preferred embodiment of the invention, it is provided that the air guiding channel has a bottom which is configured such that penetrating water is guided to the outside. In this configuration, the baffle also has the function to prevent the undesired penetration of water through the venting valve. In this way, an additional water draining channel at the venting valve can be omitted.

According to a preferred embodiment of the invention, it is provided that the baffle is provided with mounting means for the attachment to a venting valve. This permits to mount the baffle to a venting valve with low effort, so that, for example, one and the same venting valve can be delivered with or without baffle, depending on the requirements.

According to the invention, an assembly having a venting valve and a baffle of the aforementioned type is also provided, the bottom of the air guiding channel being inclined such that penetrating water is guided to the inlet side of the baffle and out of the latter. This embodiment is then advantageous if the baffle is arranged on the outer surface of the venting valve; penetrating water does not reach the venting valve in the first place, but is already collected by the baffle and guided again to the outside.

According to the invention, it can be provided in an alternative assembly that the bottom of the air guiding channel is inclined such that water having reached the baffle through the venting valve is guided back to the venting valve so that is conducted away through the latter. This configuration makes use of a baffle which is arranged on the inner side of the venting valve, i.e. towards the vehicle interior. In this configuration, water having penetrated through the venting valve is collected by the baffle and guided back again to the venting valve. Separate measures for conducting the water away can therefore be dispensed with.

It is preferably provided that the baffle is releasably mounted to the venting valve. This configuration permits, on the one hand, to attach the baffle to the venting valve with little effort. On the other hand, it can be retrofitted to the venting valve in accordance with current requirements.

BRIEF DESCRIPTION OF THE DRAWINGS

The invention will be described below with reference to two embodiments illustrated in the accompanying drawings, in which.

DESCRIPTION OF EXEMPLARY EMBODIMENTS

Figure 1:
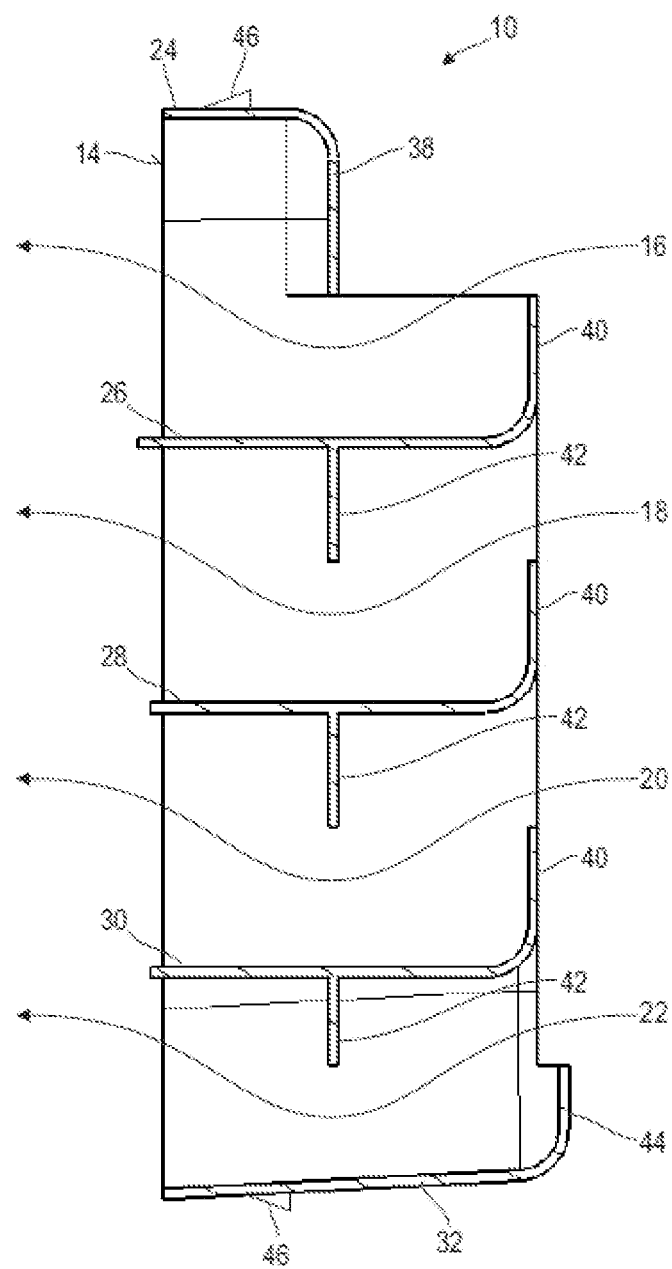
FIG. 1 shows in a schematic section a baffle according to a first embodiment of the invention.

FIG. 1 shows in a sectional view a baffle 10 which in the present case is configured as a one-piece plastic body having in the broadest sense a parallelepipedal shape. A total of four air guiding channels 16, 18, 20, 22, indicated by the flow arrows shown in FIG. 1 extend through the baffle from an inlet side 12 to an outlet side 14. The air guiding channel 16 is delimited between an upper outer wall 24 and an intermediate wall 26 which forms the bottom for the air guiding channel 16 and the upper face of the air guiding channel 18 below. On its upper face, the air guiding channel 18 is delimited by the intermediate wall 26, and on the bottom side by a further intermediate wall 28. The air guiding channel 20 for its part is delimited by the intermediate wall 28 and by a further intermediate wall 30. Finally, the air guiding channel 22 is delimited by the intermediate wall 30 and by an outer wall 32 of the baffle 10 arranged in the bottom part. Laterally, each air guiding channel 16, 18, 20, 22 is delimited by a lateral outer wall 34, 36 of the baffle.

Two respective reflection walls are arranged in each air guiding channel, which extend perpendicularly to an imaginary longitudinal axis of each air guiding channel oriented in the horizontal direction in FIG. 1. A centre reflection wall 38 and a rear reflection wall 40 are arranged in the upper air guiding channel 16. The center reflection wall 38 is configured as a one-piece extension of the upper outer wall 24, whereas the rear reflection wall 40 is configured as an upwardly extending one-piece extension of the intermediate wall 26. The same reflection wall 40 is arranged in the two center air guiding channels 18, 20. The center reflection wall 42 of these two air guiding channels is formed by a web 42 projecting downwards and perpendicularly from the intermediate wall 26 and 28, respectively. Such a reflection wall 42 is also provided for the lower air guiding channel 22, whereas the rear reflection wall is formed for the lower air guiding channel 22 by an upwardly extending extension 44 of the lower outer wall 32.

The reflection wall 38 or 42, respectively, arranged in the middle of each air guiding channel ends approximately at the same level as the rear reflection wall 40 or 44, respectively, and forms, along with the latter, a labyrinth geometry. This labyrinth geometry prevents a straight passage of an air flow through the baffle in a horizontal direction with respect to FIG. 1. It rather forces a curved extension of the air flow as symbolized by the arrows 16, 18, 20, 22.

Figure 2:
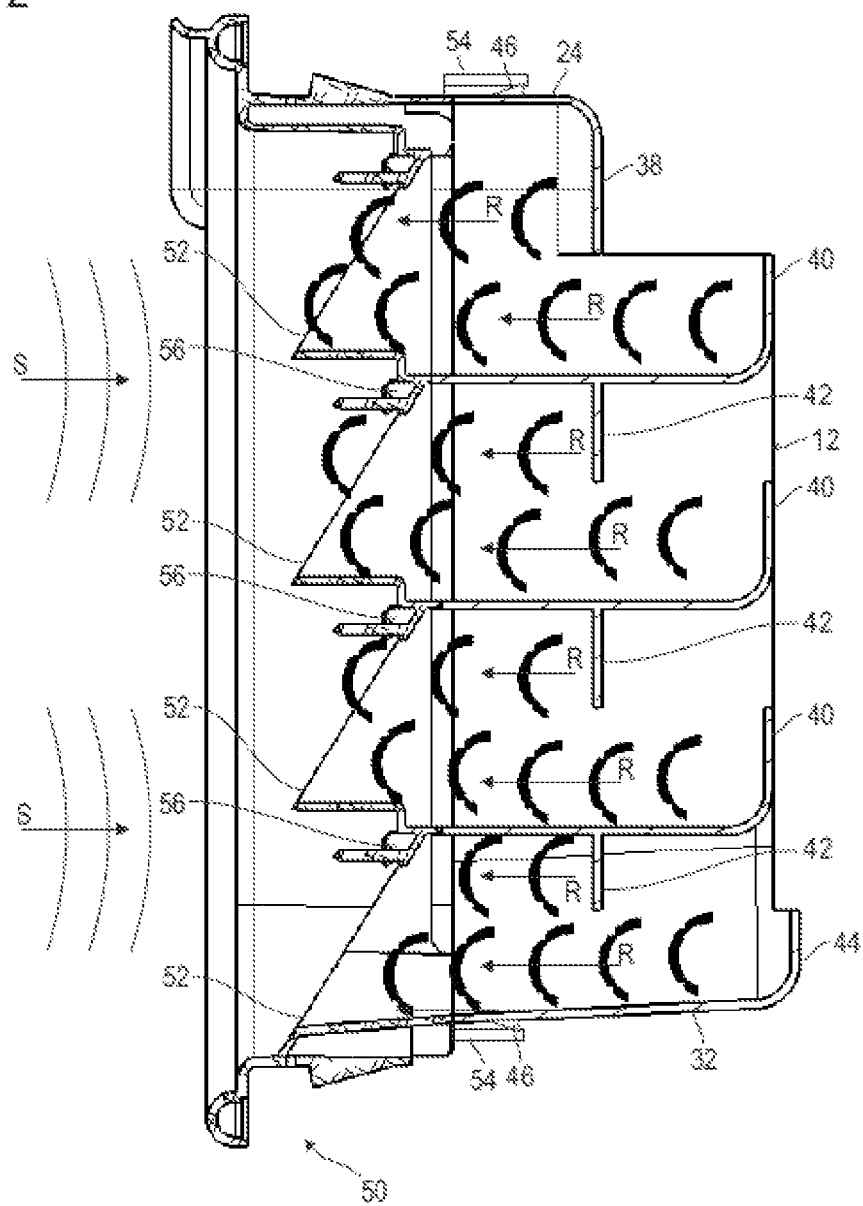
FIG. 2 shows in a schematic section the baffle of FIG. 1 mounted to a venting valve.
Figure 3:
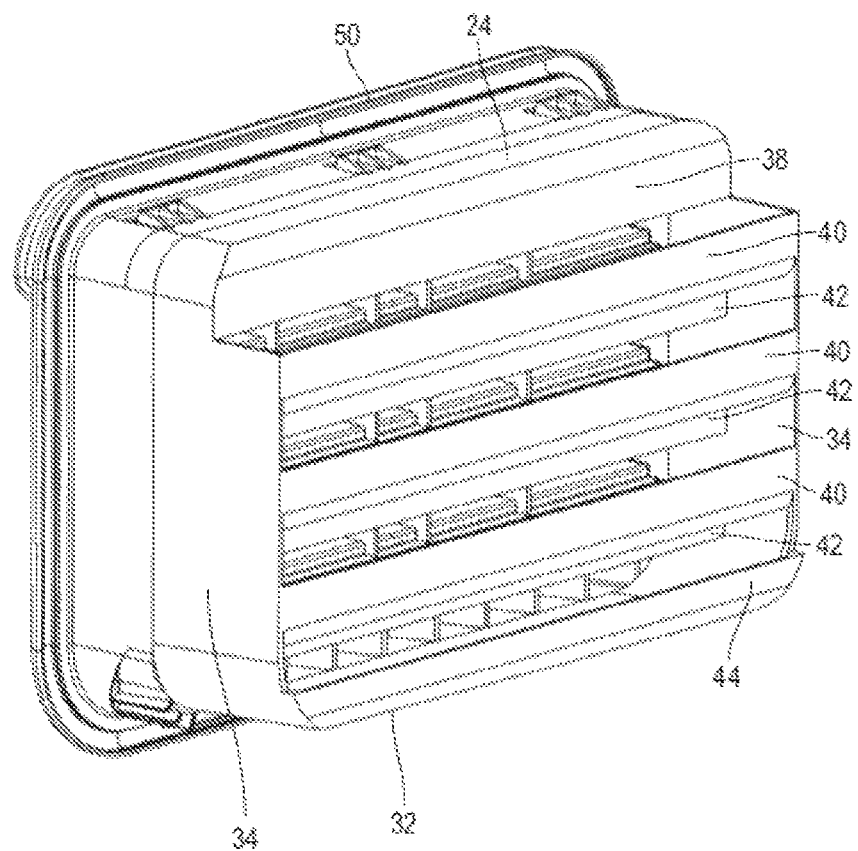
FIG. 3 shows a perspective view of the assembly shown in FIG. 2.

In FIGS. 2 and 3, the baffle 10 is shown fixed to a venting valve 50. The venting valve is mounted in an opening of a vehicle structure and has a plurality of check valves 52, which are shown only schematically in the present case and through which the air can escape to the outside out of the vehicle interior. The baffle 10 is releasably mounted to the face of the venting valve 50 facing the vehicle interior, for example by means of snap hooks 54 engaging latching projections 48 of the baffle.

In FIG. 2, the sound acting onto the venting valve 50 from the outside is symbolized by the arrows S. It can be seen that the sound admitted through the check valves 52 is reflected on the reflection walls 38, 40, 42, 44 and is reverberated to the exterior (see arrows R).

An advantageous side effect of the baffle 10 is that it prevents the admission of water into the vehicle interior through the venting valve 50. Due to the configuration of the air guiding channels, the reflection walls 40, 44 at the latest act as a collecting wall for the water which could penetrate through the check valves 55. This water is guided back to the venting valve 50 by the intermediate walls 26, 28, 30 or by the lower outer wall 32, where it is conducted to the exterior directly via the opening associated with the check valves 52, or via water draining channels 56.

Unlike the embodiment shown in FIGS. 1 to 3, the arrangement of the reflection walls 38, 42 that are arranged approximately in the middle of the air guiding channels, and of the reflection walls 40, 44 that are arranged at the end facing away from the venting valve 50 can also be interchanged, which means that the center reflection walls extend upwards from the bottom of the air guiding channel, and the rear reflection walls extend downwards from the upper face. In this variant, both the reflecting effect and the water collecting effect are maintained.

Figure 4:
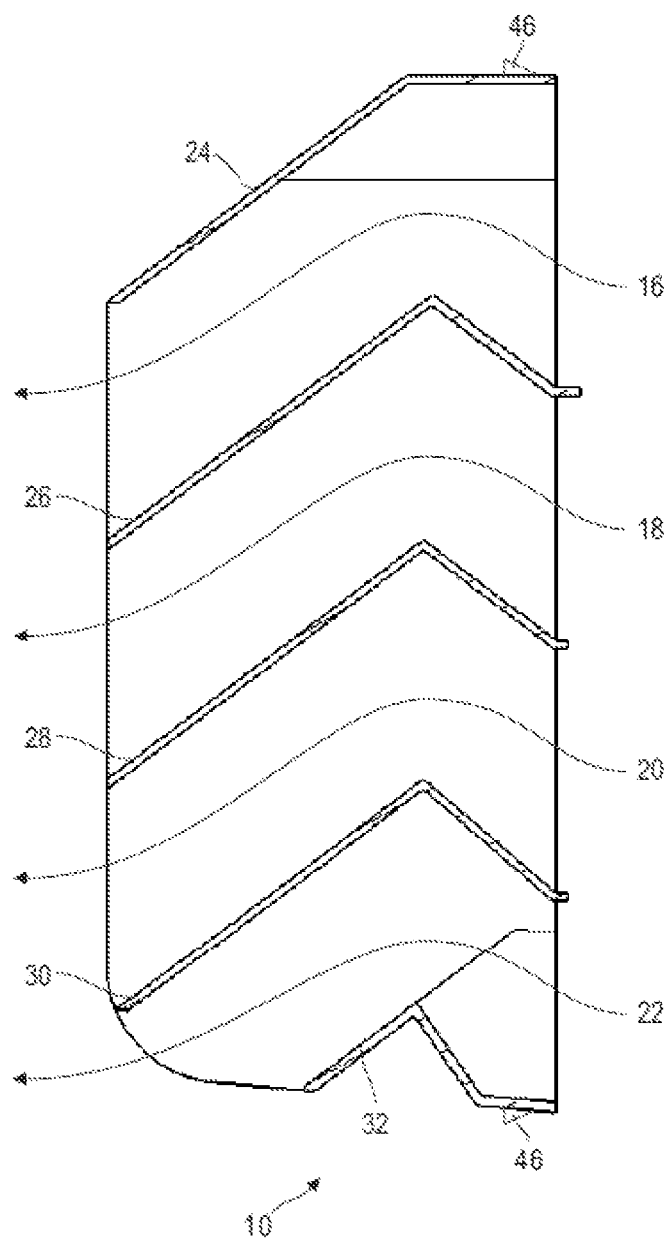
FIG. 4 shows in a schematic sectional view a baffle according to a second embodiment.

FIG. 4 shows a second embodiment which differs from the first embodiment with respect to the arrangement of the baffle 10 on the venting valve 50 and with respect to the configuration of the air guiding channels.

The baffle 10 shown in FIG. 4 is arranged on the outer surface of the venting valve 50, i.e. downstream of the venting valve with respect to the air flow from the interior to the exterior. A second difference is that no reflection walls oriented approximately perpendicularly to an imaginary longitudinal axis of the air guiding channel are used. Rather, each air guiding channel extends in a bent or angled manner such that the labyrinth geometry if formed by the upper and the lower limitation of the air guiding channels themselves. To this end, each intermediate wall 26, 28, 30 is configured in an angled manner, i.e. with a roof-like shape. Seen along the flow direction, each air guiding channel 16, 18, 20, 22 is first ascending and then ascending to the outlet-side end of the baffle 10. The vertex of the intermediate wall 26, 28, 30 defining the bottom of each air guiding channel or of the lower outer wall 32 is at a level approximately even with the outlet-side upper edge of the appropriate air guiding channel, which is defined by the upper outer wall 24 or the intermediate walls 26, 28, 30. The labyrinth geometry also prevents or reduces the admission of sound into the vehicle interior from the outside through the venting valve 50. Additionally, a protection against penetrating water is provided as the outside ascending part of the air guiding channels immediately collects penetrating water and conducts it again to the outside before it reaches the venting valve 50.

All embodiments have in common that the cross-section of the air guiding channels is not only limited by the labyrinth geometry but is approximately at least as large as the flow cross-section provided by the check vales 52 of the venting valves 50. In this way, the volume flow rate of the venting valve is not impaired.

Unlike the embodiments shown, the baffle 10 can also be realized in several pieces, for example to manufacture it in a simpler way. In principle, it is also possible the configure the baffles in one piece with the venting valves. However, baffles are preferably configured such that they can be mounted as add-on part to the corresponding venting valve.

The invention claimed is:

1. A baffle (10) for a venting valve for reducing the sound admission into the interior of a motor vehicle, including at least one air guiding channel (16, 18, 20, 22) having a labyrinth geometry, the air guiding channel having an inlet side and an outlet side and guiding air from an interior of the motor vehicle to an exterior of the motor vehicle, the inlet side being in fluid communication with the interior of the motor vehicle and the outlet side being in fluid communication with the exterior of the motor vehicle, the air guiding channel having a longitudinal axis extending from the inlet side of the air guiding channel to the outlet side of the air guiding channel, two rigid reflection walls being arranged in the at least one air guiding channel, the two rigid reflection walls extending perpendicular to the longitudinal axis of the at least one air guiding channel and permitting air to travel from the inlet side to the outlet side at all times, a first of the two rigid reflection walls being arranged at the inlet side, and a second of the two rigid reflection walls being arranged approximately midway between the inlet side and the outlet side.

2. The baffle (10) according to claim 1, wherein one of the rigid reflection walls (40, 42) is realized by an extension formed in one piece with a bottom of the at least one air guiding channel.

3. The baffle (10) according to claim 1, wherein the at least one air guiding channel (16, 18, 20, 22) has a roof-like shape extending in a slanted manner.

4. The baffle (10) according to claim 3, wherein a bottom of the at least one air guiding channel (16, 18, 20, 22) extends from an inlet side first so as to be ascending and then descending.

5. The baffle (10) according to claim 4, wherein a vertex of the bottom (26, 28, 30, 32) is arranged at least at the level of an upper edge of the outlet-side end of the at least one air guiding channel.

6. The baffle (10) according to claim 1, wherein the at least one air guiding channel (16, 18, 20, 22) has a bottom configured such that penetrating water is guided to the outside.

7. The baffle (10) according to claim 1, wherein it is provided with mounting means (46) for the attachment to a venting valve.

8. An assembly including a venting valve (50) and a baffle (10) according to claim 1, wherein the bottom (26, 28, 30, 32) of the at least one air guiding channel (16, 18, 20, 22) is inclined such that penetrating water is guided to the inlet side of the baffle (10) and out of the latter.

9. An assembly including a venting valve (50) and a baffle according to claim 1, wherein the bottom (26, 28, 30, 32) of the at least one air guiding channel is inclined such that water having reached the baffle (10) through the venting valve (50) is guided back to the venting valve (50) so that it is conducted away through the latter.

10. The assembly according to claim 8, wherein the baffle (10) is releasably mounted to the venting valve (50).

11. A baffle (10) for a venting valve for reducing the sound admission into the interior in particular of a motor vehicle, including at least two air guiding channels (16, 18, 20, 22) having a labyrinth geometry and being arranged adjacent to each other, the air guiding channels having an inlet side and an outlet side and guiding air from an interior of the motor vehicle to an exterior of the motor vehicle, the inlet side being in fluid communication with the interior of the motor vehicle and the outlet side being in fluid communication with the exterior of the motor vehicle, the air guiding channels having a longitudinal axis extending from the inlet side of the air guiding channels to the outlet side of the air guiding channels, two rigid reflection walls being arranged in each of the air guiding channels permitting air to travel from the inlet side to the outlet side at all times at least one of the two rigid reflection walls being arranged approximately midway between the inlet side and the outlet side, and an intermediate wall being provided between the two air guiding channels extending parallel to the longitudinal axis, the two rigid reflection walls extending from the intermediate wall.

12. The baffle according to claim 11, wherein the two rigid reflection walls each have a connected edge and a free edge, each rigid reflection wall being fixed to the intermediate wall at its connected edge and the connected edges of the two rigid reflection walls being arranged at the intermediate wall spaced along the longitudinal axis.

13. The baffle according to claim 11, wherein the two rigid reflection walls extend on opposite sides of the intermediate wall, the first rigid reflection wall extending into a first of the at least two air guiding channels and the second rigid reflection wall extending into a second of the at least two air guiding channels.

14. The baffle according to claim 11, wherein the two rigid reflection walls extend perpendicular to the longitudinal axis.

* * * * *